UNITED STATES PATENT OFFICE.

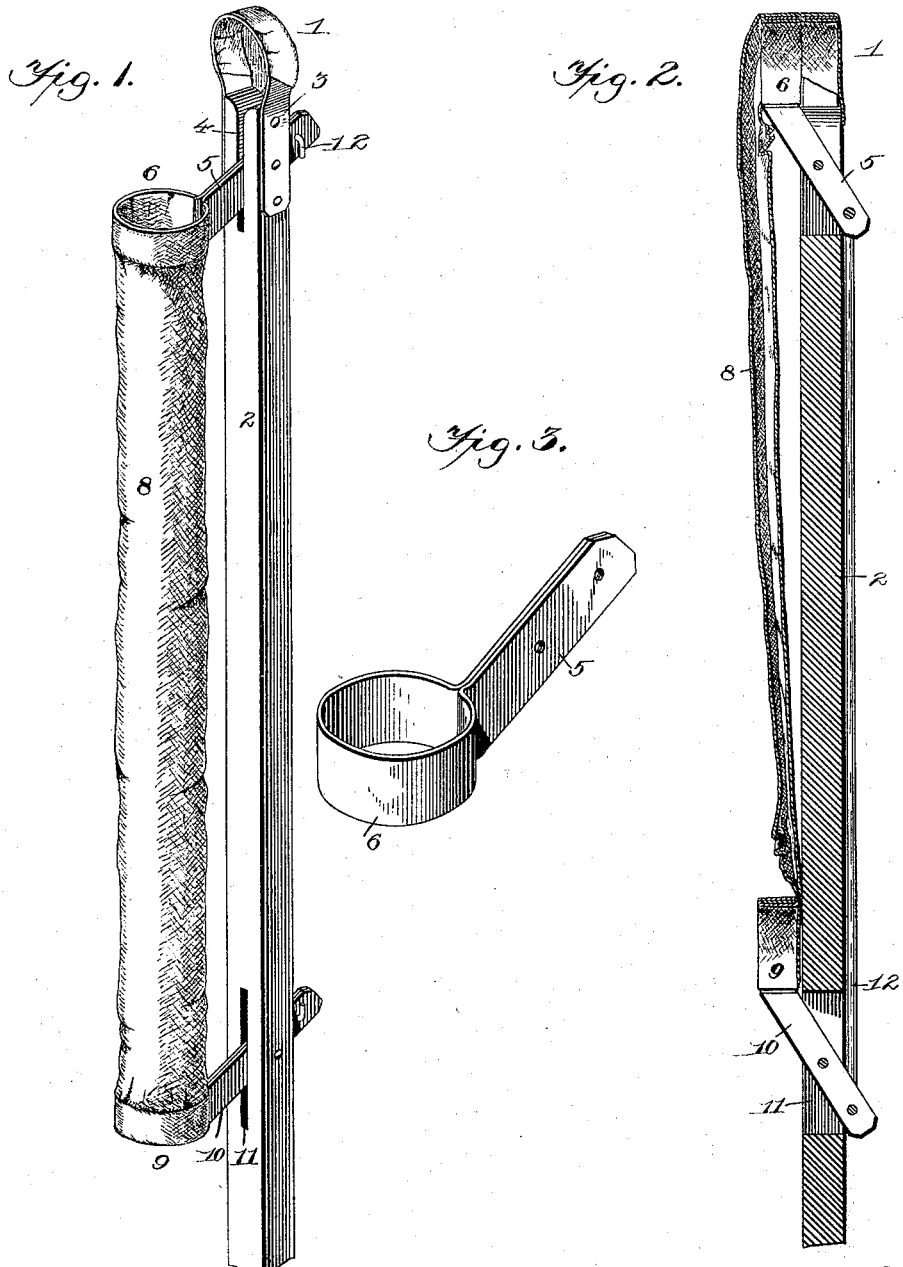

IRA C. DRAKE, OF SOUTH PRAIRIE, WASHINGTON.

FRUIT-GATHERER.

SPECIFICATION forming part of Letters Patent No. 591,113, dated October 5, 1897.

Application filed October 3, 1896. Serial No. 607,767. (No model.)

*To all whom it may concern:*

Be it known that I, IRA C. DRAKE, a citizen of the United States, residing at South Prairie, in the county of Pierce and State of Washington, have invented a new and useful Fruit-Gatherer, of which the following is a specification.

The invention relates to improvements in fruit-gatherers.

The object of the present invention is to improve the construction of fruit-gatherers and to provide an exceedingly simple and inexpensive one adapted for rapidly gathering fruit from trees and capable of enabling the same to be readily delivered to the hand of the operator without bruising it.

The invention consists in the construction and novel combination and arrangement of parts hereinafter fully described, illustrated in the accompanying drawings, and pointed out in the claims hereto appended.

In the drawings, Figure 1 is a perspective view of a fruit-gatherer constructed in accordance with this invention, the jaws being open. Fig. 2 is a longitudinal sectional view, the jaws being closed. Fig. 3 is a detail perspective view of the movable jaw.

Like numerals of reference designate corresponding parts in all the figures of the drawings.

1 designates a substantially cylindrical fixed jaw mounted on a pole 2 at the upper end thereof and consisting of a strip 3, of metal bent intermediate of its ends to form a circular loop and having its terminals secured to the pole 2 at opposite sides thereof. The circular loop of the strip 3 forms a frame for supporting a fabric covering which completes the jaw and coöperates with the circular loop to form a cylindrical receptacle.

The upper or outer end of the pole has a longitudinal bifurcation or slot 4, in which is pivoted an upper lever 5, fulcrumed intermediate of its ends and projecting from the front and back of the pole. The front arm of the lever is provided with a cylindrical loop 6, forming a movable jaw and adapted, as illustrated in Fig. 2 of the accompanying drawings, to close against the edges of the stationary jaw. In the operation of the device the jaws close over the fruit and it is readily pulled from a tree. The movable jaw 6 is arranged at the upper end or mouth of a flexible tube 8, disposed longitudinally of the pole and forming a chute for conducting fruit from a tree to the operator. The lower end of the chute is attached to a circular loop 9 of a lower lever 10, which is fulcrumed in the longitudinal slot 11, near the lower end of the pole. The lower lever 10, which is arranged similar to the upper lever 5, is fulcrumed intermediate of its ends in the slot 11 and extends in front and in rear of the pole. The rearwardly-disposed arms of the upper and lower levers are connected by a rod 12, and the movable jaw is operated by raising and lowering the lower lever.

The jaws are first opened and arranged adjacent to the fruit to be picked. They are then closed over the fruit by moving the lower lever upward, and the fruit may then be readily pulled from the tree. The lower lever is then moved downward sufficiently to permit the fruit to pass slowly down the tube to prevent bruising, and the hand of the operator being arranged at the outer end of the lower lever at the loop is in position to receive the fruit as soon as the lever is lowered sufficiently to permit the fruit to drop from the tube. When the lower lever which operates the device is moved upward, it closes the lower end of the tube by folding it, as illustrated in Fig. 2 of the accompanying drawings.

It will be seen that the fruit-picker is simple and comparatively inexpensive in construction, that it is adapted to gather fruit rapidly and that it is capable of controlling the descent of the fruit to prevent the same from being bruised. It will also be apparent that the loop of the operating-lever is located at the discharge end of the tube and that the hand of the operator in manipulating the device is in position to receive the fruit.

What I claim is—

1. A fruit-gatherer comprising a pole, a fixed jaw arranged at the top of the pole, upper and lower levers fulcrumed intermediate with their ends on the pole and provided with loops, the loop of the upper lever forming a movable jaw and being arranged to coöperate with the fixed jaw, a flexible tube having its ends connected with the loops of the levers, and means for operating the upper lever, whereby the lower lever will be simultaneously operated and caused to close the lower end of the flexible tube automatically, substantially as described.

2. A fruit-gatherer comprising a pole, a fixed jaw mounted on the upper end of the pole, upper and lower levers fulcrumed intermediate of their ends and the pole, extending from opposite sides thereof and provided at the front ends with loops, the loop of the upper lever forming a movable jaw and being arranged to coöperate with the fixed jaw, a flexible tube having its ends secured to the said loops and being spread by the same, and a connecting-rod disposed longitudinally of the pole and pivoted to the rear ends of the levers, substantially as and for the purpose described.

In testimony that I claim the foregoing as my own I have hereto affixed my signature in the presence of two witnesses.

IRA C. DRAKE.

Witnesses:
C. P. KIMBALL,
IDA B. KIMBALL.